(12) United States Patent
Proca et al.

(10) Patent No.: US 8,553,096 B2
(45) Date of Patent: Oct. 8, 2013

(54) SYSTEMS AND METHODS FOR PERFORMING GYROSCOPIC IMAGE STABILIZATION

(75) Inventors: Adrian Proca, Santa Cruz, CA (US); William Jacobs, Santa Cruz, CA (US)

(73) Assignee: CISCO Technology, Inc., San Jose, CA (US)

( * ) Notice: Subject to any disclaimer, the term of this patent is extended or adjusted under 35 U.S.C. 154(b) by 0 days.

(21) Appl. No.: 13/312,857

(22) Filed: Dec. 6, 2011

(65) Prior Publication Data
US 2013/0141600 A1    Jun. 6, 2013

(51) Int. Cl.
*H04N 5/228*    (2006.01)
(52) U.S. Cl.
USPC ..................... 348/208.2; 348/208.6
(58) Field of Classification Search
USPC ............. 348/208.99–208.4, 208.6, 208.12, 348/208.13
See application file for complete search history.

(56) References Cited

U.S. PATENT DOCUMENTS

| 6,801,247 B1 * | 10/2004 | Ohishi et al. | 348/208.1 |
| 8,274,570 B2 * | 9/2012 | Handa et al. | 348/208.3 |
| 2010/0289907 A1 * | 11/2010 | Nakano et al. | 348/208.4 |

\* cited by examiner

*Primary Examiner* — Timothy J Henn
(74) *Attorney, Agent, or Firm* — Patterson & Sheridan LLP

(57) ABSTRACT

Systems and methods for performing digital image stabilization implemented in a digital camera. The digital camera includes a gyroscope to measure motion of the digital camera and processes the signals from the gyroscope to track the total displacement of an image sensor over a series of frames of video. The algorithm implemented by the digital camera includes a processing block for correcting a DC bias in the signals from the gyroscope, a filter for attenuating the signals during periods of high acceleration, a processing block for detecting the start of a panning motion, and a processing block for quickly retracing the digital image stabilization correction back to the center of the image sensor during a panning motion.

20 Claims, 10 Drawing Sheets

100

| 200 | 201 | 202 | 203 | 204 | 205 | 206 | 207 | 208 | 209 |
|-----|-----|-----|-----|-----|-----|-----|-----|-----|-----|
| 210 | 211 | 212 | 213 | 214 | 215 | 216 | 217 | 218 | 219 |
| 220 | 221 | 222 | 223 | 224 | 225 | 226 | 227 | 228 | 229 |
| 230 | 231 | 232 | 233 | 234 | 235 | 236 | 237 | 238 | 239 |
| 240 | 241 | 242 | 243 | 244 | 245 | 246 | 247 | 248 | 249 |
| 250 | 251 | 252 | 253 | 254 | 255 | 256 | 257 | 258 | 259 |
| 260 | 261 | 262 | 263 | 264 | 265 | 266 | 267 | 268 | 269 |
| 270 | 271 | 272 | 273 | 274 | 275 | 276 | 277 | 278 | 279 |
| 280 | 281 | 282 | 283 | 284 | 285 | 286 | 287 | 288 | 289 |
| 290 | 291 | 292 | 293 | 294 | 295 | 296 | 297 | 298 | 299 |

Figure 5A

| 200 | 201 | 202 | 203 | 204 | 205 | 206 | 207 | 208 | 209 |
|-----|-----|-----|-----|-----|-----|-----|-----|-----|-----|
| 210 | 211 | 212 | 213 | 214 | 215 | 216 | 217 | 218 | 219 |
| 220 | 221 | 222 | 223 | 224 | 225 | 226 | 227 | 228 | 229 |
| 230 | 231 | 232 | 233 | 234 | 235 | 236 | 237 | 238 | 239 |
| 240 | 241 | 242 | 243 | 244 | 245 | 246 | 247 | 248 | 249 |
| 250 | 251 | 252 | 253 | 254 | 255 | 256 | 257 | 258 | 259 |
| 260 | 261 | 262 | 263 | 264 | 265 | 266 | 267 | 268 | 269 |
| 270 | 271 | 272 | 273 | 274 | 275 | 276 | 277 | 278 | 279 |
| 280 | 281 | 282 | 283 | 284 | 285 | 286 | 287 | 288 | 289 |
| 290 | 291 | 292 | 293 | 294 | 295 | 296 | 297 | 298 | 299 |

SYSTEMS AND METHODS FOR PERFORMING GYROSCOPIC IMAGE STABILIZATION

BACKGROUND

1. Technical Field

The present disclosure relates generally to digital image stabilization and, more specifically, to systems and methods for performing gyroscopic image stabilization.

2. Description of the Related Art

Many digital camera systems implement a technique for attenuating small amounts of camera motion in a digital video captured by the digital camera. For example, some digital camera systems may place the image sensor on a platform that includes a mechanical damping system for attenuating high frequency motion. Other digital camera systems may implement an image stabilization algorithm in hardware or software by generating each frame of the digital video from a different portion of the image sensor or by cropping each frame of the digital video such that the origin of the frame is fixed on one point in the captured image and scaling the cropped frame to fit the resolution of the video format.

Many of these techniques suffer from deficiencies that introduce artificial motion into the digital video. For example, a technique that implements motion attenuation with a mechanical system, such as by using springs and dampers, may cause the image sensor to move after all motion of the camera has stopped due to the potential energy stored in the springs during the motion. In another example, many conventional digital image stabilization algorithms build up a large displacement during a motion which is then slowly retraced back to the center of the image sensor only after the camera motion is complete. The digital video captured using these systems may include a "rubber-band" effect where the apparent motion of the camera lags behind the actual motion of the camera such that the video fails to reflect camera motion at the start of a panning motion and reflects camera motion even after the physical camera stops moving.

Accordingly, there is a need in the art for improved systems and methods that transparently correct for small displacements in the camera position.

BRIEF DESCRIPTION OF THE DRAWINGS

So that the manner in which the features of the present disclosure can be understood in detail, a more particular description may be had by reference to example embodiments, some of which are illustrated in the appended drawings. It is to be noted, however, that the appended drawings illustrate only example embodiments and are therefore not to be considered limiting in scope, for the disclosure may admit to other equally effective embodiments.

FIG. 5A is a conceptual illustration of active pixel locations of an image sensor, according to one example embodiment;

FIG. 5B is a conceptual illustration of active pixel locations of an image sensor for a digital camera that implements digital image stabilization, according to one example embodiment;

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

Figures 1, 2:
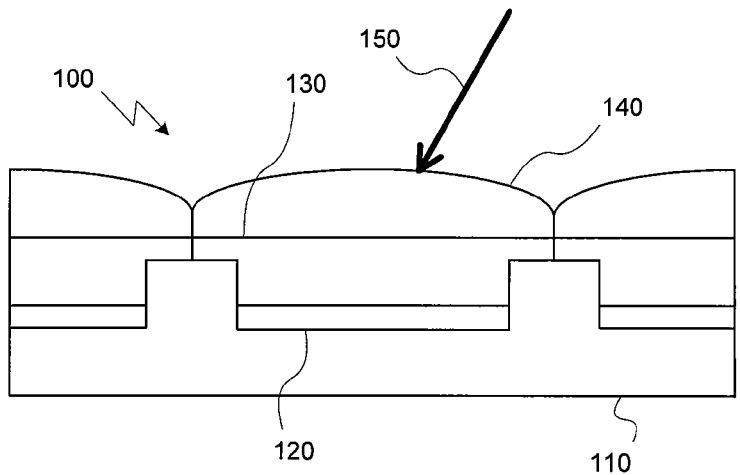
FIGS. 1 and 2 illustrate an image sensor, according to one example embodiment.

In the following description, numerous specific details are set forth to provide a more thorough understanding of various example embodiments. However, it will be apparent to one of skill in the art that certain embodiments may be practiced without one or more of these specific details. In other instances, well-known features have not been described in order to avoid obscuring the disclosure.

Overview

One example embodiment sets forth a method receiving motion feedback data via a sensor that indicates motion associated with a digital camera, determining a DC level associated with the sensor that indicates a value of the motion feedback data corresponding to zero motion of the digital camera, and modifying the motion feedback data based on the DC level. The method further includes the steps of, identifying a plurality of active pixel locations based on the modified motion feedback data that comprise a subset of all pixel locations associated with an image sensor of the digital camera, where each active pixel location is offset from a corresponding pixel location of the image sensor that is associated with a zero offset, and generating a digital image based on the plurality of active pixel locations.

Another example embodiment sets forth a computer-readable medium including instructions that, when executed by a processing unit, cause the processing unit to perform the steps of receiving motion feedback data via a sensor that indicates motion associated with a digital camera, determining a DC level associated with the sensor that indicates a value of the motion feedback data corresponding to zero motion of the digital camera, and modifying the motion feedback data based on the DC level. The steps further include identifying a plurality of active pixel locations based on the modified motion feedback data that comprise a subset of all pixel locations associated with an image sensor of the digital camera, where each active pixel location is offset from a corresponding pixel location of the image sensor that is associated with a zero offset, and generating a digital image based on the plurality of active pixel locations.

Yet another example embodiment sets forth a system comprising an image sensor and a processing unit. The image sensor is associated with a digital camera and includes a plurality of pixel locations. The processing unit is configured to receive motion feedback data via a sensor that indicates motion associated with a digital camera, determine a DC level associated with the sensor that indicates a value of the motion feedback data corresponding to zero motion of the digital camera, and modify the motion feedback data based on the DC level. The processing unit is further configured to identify a plurality of active pixel locations based on the modified motion feedback data that comprise a subset of all pixel locations associated with an image sensor of the digital camera, where each active pixel location is offset from a corresponding pixel location of the image sensor that is associated with a zero offset, and generate a digital image based on the plurality of active pixel locations.

One advantage of the disclosed technique is that the apparent digital image stabilization is more effective than conventional systems. The gyroscope provides accurate motion feedback data that enables the digital camera to more accurately generate a stable video. In addition, the disclosed technique dynamically corrects the digital image stabilization algorithm and hides motion of the video resulting from digital image stabilization during actual motion of the digital camera, causing motion of the video to be harder to detect.

Detailed Description of the Figures

FIGS. 1 and 2 illustrate an image sensor 100, according to one example embodiment. Image sensor 100 may be a charge coupled device (CCD) or a complementary metal oxide semiconductor (CMOS) pixel sensor. As shown in FIG. 1, image sensor 100 may include a silicon substrate 110 that includes a pixel location 120. Pixel location 120 collects charge proportional to the number of photons that strike the photosensitive area of pixel location 120. Located above pixel location 120 is a color filter 130 that allows photons with a wavelength in a specific region of visible light to pass through. Without color filter 130, pixel location 120 would generate a voltage based on the amount of photons of every wavelength that strike the photosensitive area of pixel location 120. With color filter 130, pixel location 120 is configured to generate a voltage that is proportional to the intensity of visible light corresponding to the frequency pass band of the given color filter 130 that strikes the photosensitive area of pixel location 120. Microlens 140 is located above color filter 130 and focuses photons 150 towards the photosensitive area of pixel location 120. Image sensor 100 may include integrated circuit components (not shown) built into silicon substrate 110 around the perimeter of pixel location 120.

As shown in FIG. 2, image sensor 100 includes a two-dimensional array of pixel locations 200-299 arranged on silicon substrate 110. In one embodiment, image sensor 100 is configured with a color filter array (CFA) in a Bayer Filter Mosaic pattern (i.e., a repeating pattern of a 2×2 array with a green color filter over the upper left pixel location, a red color filter over the upper right pixel location, a blue color filter over the lower left pixel location, and a second green color filter over the lower right pixel location). In alternative embodiments, image sensor 100 includes a different type of CFA such as CMYW (Cyan Magenta Yellow White) CFAs, RGBW (Red Green Blue White) CFAs, or RGBE (Red Green Blue Emerald) CFAs. In yet other embodiments, each pixel location of image sensor 100 may sense the intensity of a plurality of color channels without the use of a CFA, such as by separating the different wavelengths of light using dichroic mirrors or using vertically stacked active pixel sensors. It will be appreciated that any image sensor 100 having an array of pixel locations may implement one or more aspects of the present disclosure.

In one embodiment, the CFA integrates color filters corresponding to three separate color channels into the image sensor 100 to generate intensity values for each pixel location (200, 201, etc.) corresponding to a red color channel, a green color channel, or a blue color channel. Each pixel location of image sensor 100 stores an intensity of light for one of the three color channels. The pixel locations 200-299 of image sensor 100 are arranged such that each 2×2 block of pixel locations, when sampled, corresponds to two intensity values of a green color channel as well as one intensity value of a red color channel and one intensity value of a blue color channel. For example, the first row of pixel locations in image sensor 100 includes pixel locations 200-209. Pixel locations 200, 202, 204, 206, and 208 each store an intensity value corresponding to the green color channel. Pixel locations 201, 203, 205, 207 and 209 each store an intensity value corresponding to the red color channel. The second row of pixel locations includes pixel locations 210-219. Pixel locations 210, 212, 214, 216, and 218 each store an intensity value corresponding to the blue color channel. Pixel locations 211, 213, 215, 217, and 219 each store an intensity value corresponding to the green color channel. The remaining pixel locations (i.e., pixel locations 220-299) are arranged in a repeating pattern similar to the first and second rows of pixel locations of image sensor 100.

When a digital camera captures an image via image sensor 100, one or more pixel locations in image sensor 100 are sampled to generate an intensity value for one of the three color channels of a pixel in the digital image. For example, in order to generate a digital image in an RGB format (where each pixel in the digital image stores an intensity value for each of the red, green, and blue color channels), a 2×2 block of pixel locations in the image sensor 100 are sampled to generate one pixel in the digital image. In one embodiment, the sampled values of pixel location 200 and pixel location 211 are averaged to calculate an intensity value for the green color channel of the upper left pixel in a digital image generated via image sensor 100. The sampled value of pixel location 201 corresponds to the red color channel of the upper left pixel and the sampled value of pixel location 210 corresponds to the blue color channel of the upper left pixel. In some alternative embodiments, each pixel of the digital image may correspond to a block size that is larger than 2×2 pixel locations in image sensor 100. For example, each pixel of the digital image may include filtered intensity values generated based on a plurality of samples from a 3×3 block of pixel locations. Each color channel of the corresponding pixel is an interpolated value from a subset of pixel locations in the 3×3 block. One such filter that may be implemented by a digital camera is a Gaussian filter of a 3×3 block of pixels, where each of the eight pixel locations surrounding a central pixel location that are associated with a color channel contributes to at least a portion of the intensity value for that color channel of the corresponding pixel in the digital image based on the distance of the pixel location from the central pixel location.

Figure 3:
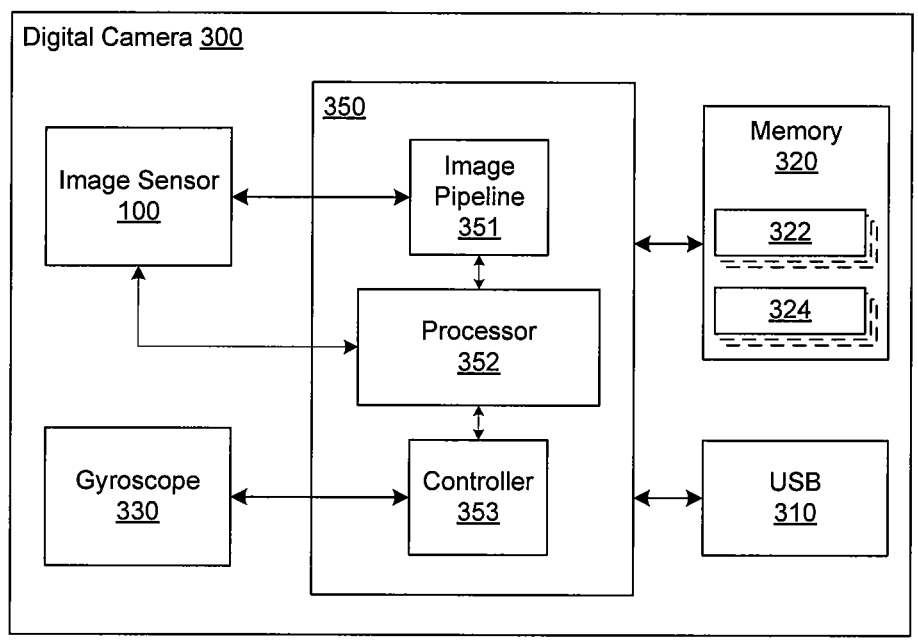
FIG. 3 illustrates a digital camera configured to implement gyroscopic digital image stabilization, according to one example embodiment.

FIG. 3 illustrates a digital camera 300 configured to implement gyroscopic digital image stabilization, according to one example embodiment. As shown, digital camera 300 includes an image sensor 100, described above, a gyroscope 330, a processing unit 350, a memory 320, and a USB™ interface 310. In one embodiment, processing unit 350 is a system-on-chip (SOC) that includes a digital image processing pipeline 351, a processor 352, and a controller 353. In alternative embodiments, one or more components of processing unit 350 may be implemented on separate chips. Memory 320 stores data and firmware for digital camera 300. In one embodiment, memory 320 may include volatile memory such as dynamic random access memory (DRAM) as well as non-volatile memory such as a flash memory. The non-volatile memory may include a non-removable flash device that stores the firmware of digital camera 300. In some embodiments, the non-volatile memory may also include a removable flash memory device such as an SD card. Digital camera 300 may store digital images 322 as well as digital videos 324 in the non-volatile memory of memory 320. Digital camera 300 may include a communications interface such as USB™ interface 310, or some other technically feasible communication interface, to transmit the digital images 322 or digital videos 324 to a peripheral device.

In one embodiment, processor 352 executes firmware for the digital camera 300 that is configured to control the different functions and operations of the digital camera 300 such as triggering the capture of raw image sensor data, displaying a user interface on an liquid crystal display (LCD) (not shown), monitoring input from controls, and other like functions. Processor 352 also implements the digital image stabilization algorithm described below. In one embodiment, processor 352 is a reduced instruction set computer (RISC). Digital image processing pipeline 351 receives raw image sensor data from image sensor 100 and generates a digital image 322. One example embodiment of digital image processing pipeline 351 is illustrated below in conjunction with FIG. 4.

Controller 353 implements a serial interface to communicate with gyroscope 330. Gyroscope 330 is a sensor configured to generate velocity data that indicates a motion of digital camera 300. In one embodiment, gyroscope 330 is configured to indicate a rotational velocity of the digital camera 300 in two dimensions, such as around an x-axis and around a y-axis. The x-axis corresponds to horizontal motion in the relative direction of pixel location 200 to pixel location 209 of image sensor 100, and the y-axis corresponds to vertical motion in the relative direction of pixel location 200 to pixel location 290 of image sensor 100. The amount of rotation around an axis may be used to generate an expected displacement of the image on the image sensor 100. Gyroscope 330 may also be configured to output a temperature signal that indicates the temperature of the sensors in gyroscope 330, which may enable the digital camera 300 to adjust the DC level of the velocity data generated by gyroscope 330. In another embodiment, gyroscope 330 may be configured to output one or more additional signals that correspond to additional dimensions, such as a rotation around the Z-axis. In another embodiment, gyroscope 330 may be supplemented by an accelerometer that provides translational velocity data for the camera in one or more dimensions. Thus the velocity data may include information related to a translation of the image sensor in three dimensions as well as a rotation of the image sensor around three axes.

In one embodiment, gyroscope 330 is configured to sample the velocity data and temperature data every 1 ms (millisecond). Gyroscope 330 then transmits the captured data to controller 353 via the serial interface. Controller 353 stores the captured velocity data and temperature data in a buffer within processing unit 350. It will be appreciated that controller 353 may store a plurality of samples for each frame of captured video 324. For example, if video is captured at 30 fps, then controller 353 will store approximately 33 samples of velocity data for each frame of video (i.e., each frame corresponds to approximately 33 ms).

During normal operation, raw image sensor data is generated by image sensor 100 in response to a command received from processor 352. For example, in response to a signal from processor 352, image sensor 100 may sample the collected charge at each of the pixel locations (200, 201, etc.) in image sensor 100. In one embodiment, image sensor 100 may be configured to transmit raw image sensor data to image pipeline 351 that corresponds to the sampled intensity values for each pixel location of image sensor 100 (i.e., each pixel location of the raw image sensor data corresponds to an intensity value for one of a plurality of color channels). In another embodiment, image sensor 100 may be configured to calculate a filtered intensity value for each pixel location of image sensor 100 based on the intensity values for a plurality of pixel locations proximate to the particular pixel location of image sensor 100. For example, image sensor 100 may be configured to average a plurality of intensity values in a 3×3 block of pixel locations. In still other embodiments, image sensor 100 may be configured to generate raw image sensor data in a format in which each pixel of the raw image sensor data includes intensity values for a plurality of color channels (such as an RGB format) sampled from a plurality of different pixel locations. Image sensor 100 may be configured to transmit the raw image sensor data over a digital communications interface to digital image processing pipeline 351.

When digital camera 351 is configured to capture video, processor 352 causes image sensor 100 to capture a raw image sensor data at a particular frame rate specified by the format of the captured video. For example, processor 352 may transmit a signal to image sensor 100 approximately every 16.7 ms, which corresponds to a frame rate of 60 fps. Processor 352 also receives the buffered velocity data and/or temperature data from controller 353. The digital image stabilization algorithm calculates a stabilization vector based on the velocity data that is passed to the digital image processing pipeline 351. The digital image processing pipeline 351 then uses the stabilization vector to select a subset of active pixel locations within the raw image sensor data to generate the digital image 322. Digital image processing pipeline 351 then transmits the digital image 322 to memory 320 for storage. Alternately, digital image 322 may be stored in on-chip RAM temporarily and combined with subsequent images to generate a digital video 324. The digital video 324 may be compressed such as with the well-known H.264/MPEG 4 Part 10 codec.

It will be appreciated that one or more other components (not shown) of processing unit 350 may be included such as a local on-chip RAM, a memory interface to communicate with memory 320, or a crossbar for transferring data between digital image processing pipeline 351 and processor 352.

Figure 4:
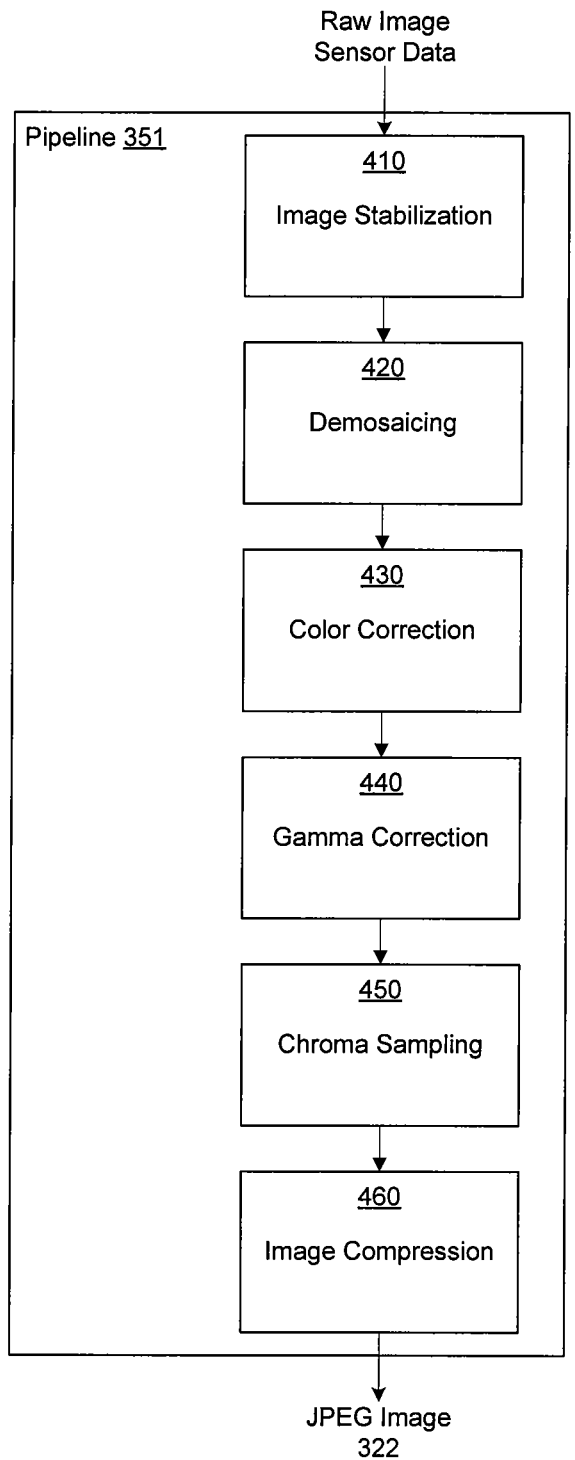
FIG. 4 illustrates a digital image processing pipeline implemented by the digital camera of FIG. 3, according to one example embodiment.

FIG. 4 illustrates a digital image processing pipeline 351 implemented by digital camera 300 of FIG. 3, according to one example embodiment. A typical example of a digital image processing pipeline 351 includes an image stabilization block 410, a demosaic processing block 420, a color correction block 430, a gamma correction block 440, a chroma subsampling block 450, and a compression block 460. It will be appreciated that various digital camera manufacturers may implement different processing blocks in digital image processing pipeline 351. For example, some digital image processing pipelines may include a white balance block (not shown), which adjusts the intensities of each color channel such that the mean intensity values associated with each color channel over all pixel locations are equal. Other digital image processing pipelines may not include one or more of the image processing blocks shown in FIG. 4.

As shown, image stabilization block 410 receives the raw image sensor data generated by image sensor 100 and selects a subset of active pixel locations from the raw image sensor data to generate the digital image 322. The image stabilization block 410 determines which pixel locations to include in the subset of active pixel locations based on the velocity data received from processor 352. In one embodiment, image sensor 100 includes more pixel locations than are included in the interpolation to produce a digital image 322 at the full resolution of the digital camera 300. For example, a CMOS image sensor with 14.6 MP (4400(H)×3316(V)) is capable of capturing QXGA resolution (2048×1536) digital images using only 4096(H)×3072(V) pixel locations (assuming each 2×2 block of pixel locations, such as implemented using an RGBE CFA, is processed to generate one pixel of the resulting digital image). Thus, if the digital image 322 is created using the subset of active pixel locations centered on the image sensor 100, the intensity values from the left most and right most one-hundred and fifty two (152) pixel locations as well as the intensity values from the top most and bottom most one-hundred and twenty two (122) pixel locations provide a margin of excess pixel locations around the exterior of image sensor 100 that enable digital camera 300 to implement some form of digital image stabilization processing, discussed in more detail below in conjunction with FIGS. 5A-5B, and 6.

Demosaic processing block 420 generates a digital image 322 in an RGB format by processing the raw image sensor data associated with the active pixel locations from image stabilization block 410. Many algorithms for interpolating the raw image sensor data exist in the art, such as nearest neighbor interpolation, bilinear interpolation, or variable gradient interpolation. In a demosaic processing block 420 that implements nearest neighbor interpolation, the intensity value sampled from each pixel location of raw image sensor data is combined with intensity values from two neighboring pixel locations to generate a pixel in a digital image 322 that includes intensity values for all three color channels. For example, the intensity value stored in pixel location 200 may be combined with the intensity values stored in pixel locations 201 and 210 to generate a single pixel in an RGB format. In a demosaic processing block 420 that implements bilinear interpolation, the intensity value stored in each pixel location of raw image sensor data is combined with interpolated intensity values from two or more neighboring pixel locations to generate a single pixel in an RGB format. For example, the intensity value sampled from pixel location 211 is combined with the average of the intensity values sampled from pixel locations 201 and 221 as well as the average of the intensity values sampled from pixel locations 210 and 212 to generate a single pixel in an RGB format.

As is well-known in the art, the demosaicing process results in a reduction in the spatial resolution of raw image sensor data. A pixel of a digital image 322 in an RGB format is associated with three intensity values corresponding to different pixel locations of the image sensor 100. In other words, a pixel is a combination of light intensity measured at three or more different spatial locations. Combining the three intensity values results in a single color for a particular pixel of the digital image 322. Such digital images may include image artifacts such as poorly defined edges and aliasing artifacts such as moire patterns.

Color correction block 430 is applied to the digital image 322 in an RGB format generated by the demosaic processing block 420. The spectral response of image sensor 100 may be different than the spectral response of a human observer. The difference between the captured colors and the colors as observed by a human observer may be due to a variety of factors such as manufacturing variance in the color filter arrays as well as crosstalk between neighboring pixel locations. Therefore, the colors captured by image sensor 100 may be corrected by mapping the captured digital image colorspace to a standard colorspace, such as sRGB.

Conventionally, color correction block 430 is implemented by multiplying each RGB pixel vector by a color correction matrix, as illustrated by Equation (i). The color correction matrix coefficients are chosen to map the captured digital image colorspace to the standard colorspace.

$$\begin{bmatrix} R' \\ G' \\ B' \end{bmatrix} = \begin{bmatrix} C_{RR} & C_{RG} & C_{RB} \\ C_{GR} & C_{GG} & C_{GB} \\ C_{BR} & C_{BG} & C_{BB} \end{bmatrix} \cdot \begin{bmatrix} R \\ G \\ B \end{bmatrix} \quad (i)$$

In addition to the demosaic processing block 420 and the color correction block 430, digital image processing pipeline 351 includes a gamma correction block 440, a chroma subsampling block 450, and a compression block 460. Gamma correction block 440 adjusts the brightness of the RGB values such that the digital image 322, when displayed on a monitor with a non-linear brightness response, properly reproduces the true colors of the captured scene. Chroma subsampling block 450 divides the three color channels into a single luminance channel and two color difference channels. Because human vision responds more to luminance than chrominance, the two color difference channels can be stored with less bandwidth than the luminance channel without reducing the overall quality of the digital image 322. Compression block 460 may take the digital image 322 and compress it into a JPEG format or other well-known compressed image format.

The gamma correction block 440, chroma subsampling block 450, and compression block 460 are conventional processing blocks well-known in the art. As discussed above, these blocks are shown for illustrative purposes in digital image processing pipeline 351, and different processing blocks in addition to or in lieu of these processing blocks are within the scope of the disclosure.

Although FIG. 4 describes the various processing blocks implemented in digital image processing pipeline 351, in other embodiments, one or more of the processing blocks may be implemented via software engines executing in processor 352. One of skill in the art would readily appreciate that one or more functions described as being executed in hardware units may also be executed via software engines. For example, image compression or video compression may be executed via a plurality of program instructions that, when executed by processor 352, are configured to compress image data generated by digital image processing pipeline 351 to generate digital video 324. In addition, portions of a processing unit may be implemented in software while different portions of the processing unit are implemented in hardware.

FIG. 5A is a conceptual illustration of active pixel locations of image sensor 100, according to one example embodiment. As shown, pixel locations 266-269, 276-279, 286-289, and 296-299 correspond to active pixel locations that are interpolated by the demosaic processing block 420 to produce a digital image 322. Pixel location 266 corresponds to the upper left pixel location in image sensor 100 that contributes to the digital image 322 when the active pixel locations are centered within image sensor 100. It will be appreciated that although the top margin and left margin of inactive pixel locations in image sensor 100 are shown to be six pixels wide, the actual width of each margin of the image sensor 100 could be any number of pixels and non-uniform (i.e., the left margin and right margin could be a different width than the top margin and bottom margin, or the location of the active pixel locations corresponding to a zero stabilization vector offset could be offset from the center of the image sensor 100 such that the left margin or top margin is not equal to the right margin or bottom margin, respectively).

FIG. 5B is a conceptual illustration of active pixel locations of image sensor 100 for a digital camera 300 that implements digital image stabilization, according to one example embodiment. Image stabilization block 410 determines which pixel locations to include in the subset of active pixel locations based on a detected motion of the digital camera 300. In one embodiment, image stabilization block 410 filters the sampled velocity data received from gyroscope 330 and integrates the velocity signal over time to calculate a displacement of the digital camera 300 in pixels. Image stabilization block 410 then generates a stabilization vector based on the displacement of the digital camera 300. For example, the active pixel locations shown in FIG. 5B are based on a stabilization vector 525 of <−4 px, 2 px>. In other words, a digital image 322 is captured, based on the calculated displacement as determined from the velocity data, by processing the pixel locations in the raw image sensor data starting with pixel location 242, which corresponds to the upper left most pixel in the digital image 322. Ideally, a point in a first frame that is located at pixel location 266 corresponds to a point in the second frame that is located at pixel location 242, where the first frame corresponds to a zero stabilization vector 525 and the second frame corresponds to a stabilization vector 525 of <−4 px, 2 px>, as calculated by the image stabilization algorithm.

In one embodiment, stabilization vector 525 may be specified in sub-pixel increments. In such embodiments, the intensity values corresponding to pixels of the resulting digital image 322 may be interpolated from two or more pixel locations in image sensor 100. For example, stabilization vector 525 could be <−3.5 px, 1.5 px>. Consequently, the calculated intensity value for the upper left most pixel in digital image 322 may be based on intensity values from pixel locations 242, 243, 252 and 253. In other embodiments, any other technically feasible manner of interpolating between pixels may be used, such as bilinear interpolation. The interpolation may be performed on the raw intensity values (i.e., where each pixel location corresponds to a single color component) or may be performed on converted image data in an RGB format.

The stabilization vector 525 is small enough that the active pixel locations corresponding to the stabilization vector 525 are within the confines of the edges of image sensor 100. However, if the total displacement of the digital camera 300 is large enough, the stabilization vector 525 may saturate the image sensor 100 (i.e., the active pixel locations for digital image 322 will correspond to pixel locations outside of the edge of image sensor 100). For example, a stabilization vector 525 of <−7 px, 2 px> in FIG. 5B corresponds to an upper left pixel location to the left of pixel location 240, which is not within the edges of image sensor 100.

Saturation of the image sensor 100 is possible for various reasons. One example where saturation commonly occurs is where a user intentionally pans the digital camera 300. A large motion results in a sustained velocity in a substantially uniform direction that may quickly increase the calculated displacement and, consequently, the stabilization vector 525 such that the active pixel locations for a captured digital image 322 would correspond to pixel locations beyond the edges of image sensor 100. Another example where saturation may occur is when the velocity signal includes a small DC offset that, over time, may cause the stabilization vector to drift, even in the absence of any actual motion of the digital camera 300.

Conventionally, an image stabilization algorithm may correct for saturation of the image sensor 100 by slowly attenuating the calculated displacement. However, the magnitude of the attenuation must be small enough to not adversely affect the operation of the image stabilization algorithm, which means that any large offset created during a panning motion of the digital camera 300 will result in a slow drift of the active pixel locations back to the center of the image sensor 100. Many times the correction continues even after the actual motion of the digital camera 300 is complete. Thus, a viewer may notice a "rubber band" effect that is introduced in the digital video 324 where the camera appears to continue moving at the end of a panning motion. Increasing the magnitude of the attenuation will decrease the extent of the "rubber band" effect after a panning motion, but may limit the effectiveness of the image stabilization algorithm such that only the highest frequency motions are corrected.

Digital Image Stabilization Algorithm

Figure 6:
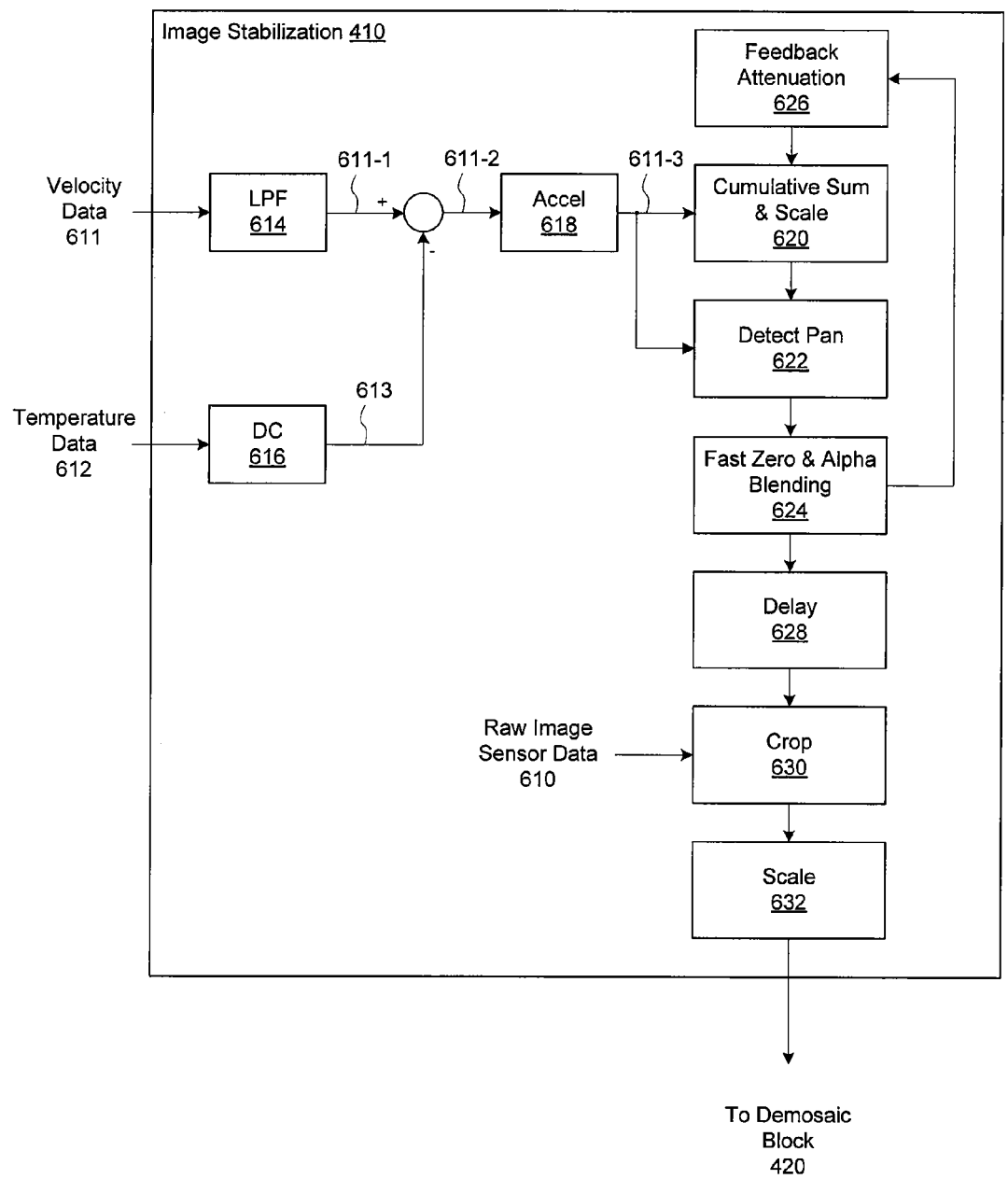
FIG. 6 illustrates the digital image stabilization block of FIG. 4, according to one example embodiment.

FIG. 6 illustrates the digital image stabilization block 410 of FIG. 4, according to one example embodiment. As shown in FIG. 6, the digital image stabilization block 410 includes a low-pass filter (LPF) 614, a DC level block 616, an acceleration block 618, a cumulative sum and scale (CSS) block 620, a pan detection block 622, a fast zero recovery and alpha blending (FZRAB) block 624, a feedback attenuation block 626, a delay block 628, a cropping block 630, and a scaling block 632.

Digital image stabilization block 410 receives raw image sensor data 610 from image sensor 100 as well as velocity data 611 and temperature data 612 from gyroscope 330 via controller 353. Velocity data 611 is transmitted to the LPF 614. In one embodiment, LPF 614 is a sixteen element digital low-pass filter. Sixteen consecutive samples from velocity data 611 are stored in a FIFO buffer and each element of the buffer is multiplied by a coefficient and summed to generate a filtered velocity data 611-1. In another embodiment, LPF 614 may include a different number of elements, such as thirty-two elements, and may also implement a feedback response that includes delayed and scaled products of the output signal (i.e., filtered velocity data 611-1) in the summation for calculating the filtered velocity data 611-1. The filtered velocity data 611-1 is then combined with the output of the DC level block 616 and transmitted to the acceleration block 618 as corrected velocity data 611-2.

DC level block 616 implements an algorithm, described in more detail below in conjunction with FIG. 7, to generate a DC level adjustment value to correct the filtered velocity data 611-1. The DC level block 616 receives the temperature data 612 from gyroscope 330 and calculates a DC level adjustment value for zeroing out the filtered velocity data 611-1 corresponding to zero rotational velocity around each of the axes of digital camera 300. The DC level block 616 corrects for small DC offsets in the velocity signal generated by gyroscope 330 that over time, if not corrected, would cause a drift in the offset vector used to crop the digital image 322 in cropping block 630. The DC level block 616 outputs a correction signal 613 that is subtracted from the filtered velocity data 611-1 to generate corrected velocity data 611-2. In one embodiment, DC level block 616 generates a different correction signal 613 for each dimension (e.g., x-axis rotational velocity and y-axis rotational velocity) associated with velocity data 611.

Acceleration block 618 attenuates the corrected velocity data 611-2 based on a calculated acceleration of the digital camera 300 to generate attenuated velocity data 611-3. Typically, an intentional panning motion of a digital camera 300 is characterized by an acceleration period where the camera begins to move, a constant velocity period where the camera moves in a substantially uniform direction at uniform speed, and a deceleration period where the digital camera 300 comes to a stop. Acceleration block 618 implements an algorithm for determining an attenuation coefficient to apply to the corrected velocity data 611-2. The algorithm is described in more detail below in conjunction with FIG. 8.

CSS block 620 receives the attenuated velocity data 611-3 and calculates a displacement value by integrating the attenuated velocity data 611-3. In one embodiment, CSS block 620 implements a saturation block that clamps the attenuated velocity data 611-3 between a high limit and a low limit. The attenuated velocity data 611-3 is then transmitted to an integration block that calculates a displacement term associated with the attenuated velocity data 611-3 by multiplying the attenuated velocity data 611-3 with a time constant that corresponds to the sampling frequency of the gyroscope 330. For example, attenuated velocity data 611-3 may indicate a rotational velocity around an axis in degrees per second that, when multiplied by 0.001 s (1 ms), results in a rotational displacement around the axis in degrees corresponding to that sampling period. The displacement term calculated based on the attenuated velocity data 611-3 is added to an attenuated displacement feedback signal generated by feedback attenuation block 626 to generate a cumulative displacement of the digital camera 300 corresponding to one or more dimensions.

The cumulative displacement calculated by CSS block 620 is transmitted to a pan detection block 622 that implements an algorithm, described in more detail below in conjunction with FIG. 9, to determine whether the digital camera 300 is being subjected to an intentional panning motion. The pan detection block 622 also receives the attenuated velocity data 611-3 generated by acceleration block 618. The pan detection block 622 monitors both the cumulative displacement generated by CSS block 620 and the attenuated velocity data 611-3 generated by acceleration block 618. The pan detection block 622 transmits a pan detection flag as well as a cumulative displacement to the FZRAB block 624, which implements an algorithm, described in more detail below in conjunction with FIG. 10, to perform a fast zero recovery and alpha blending operation when a pan is detected.

FZRAB block 624 generates an offset vector that indicates a subset of active pixel locations in image sensor 100 that are incorporated into the captured digital image 322 corresponding to one frame of a digital video 324 captured using the digital image stabilization algorithm. The FZRAB block 624, in conjunction with the feedback attenuation block 626, implements a decaying mechanism that constantly retraces the offset vector back to the center of the image sensor 100. In order to retrace the cumulative displacement to the center of the image sensor 100 during a panning motion, when large offset vectors may accumulate due to the large uniform motion of the digital camera 300, FZRAB block 624 implements a fast zero recovery block that increases the decay rate of the cumulative displacement as well as a alpha blending block that softens the transition between the slow decay rate implemented during normal operation and the fast decay rate implemented during a panning motion. As mentioned above, the feedback attenuation block 626 receives a cumulative displacement from the FZRAB block 624 and multiplies the cumulative displacement by a gain that is less than one to retrace the cumulative displacement back towards the center of the image sensor 100. The attenuated feedback signal is then transmitted to the CSS block 620 to add to the next displacement term corresponding to the next attenuated velocity data 611-3 sample.

It will be appreciated that processing blocks 614 through 626, described above, may operate at a frequency corresponding to the sampling frequency of gyroscope 330. In one embodiment, processing blocks 614 through 626 are implemented entirely in hardware within digital image processing pipeline 351. In another embodiment, processing blocks 614 through 626 may be implemented in software executed by one or more programmable hardware units in digital image processing pipeline 351. In yet another embodiment, one or more of processing blocks 614 through 626 may be implemented via software configured to execute by processor 352.

Delay block 628 implements a delay buffer that stores N previous samples of the offset vector. For example, FZRAB block 624 may generate a new offset vector at a frequency that matches the sampling frequency of the gyroscope 330. In one embodiment, gyroscope 330 and, therefore, FZRAB block 624 operate at a frequency of 1 kHz. However, in a video capture mode, digital camera 300 may capture video at a frame rate of 30 fps. In order to match up the offset vector generated by FZRAB block 624 with the correct timing of the exposure of image sensor 100, delay block 628 may select one of the previous N offset vectors output by FZRAB block 624.

Cropping block 630 receives the raw image sensor data 610 from image sensor 100 and applies the offset vector from delay block 628 to select the subset of active pixels used to generate a frame in digital video 324. The relationship between the subset of active pixels in image sensor 100 and the offset vector is described above in conjunction with FIGS. 5A and 5B.

Scaling block 632 receives the raw image sensor data 610 corresponding to the subset of active pixel locations selected by cropping block 630 and scales the image data to match a desired resolution. For example, the size of the subset of active pixels may correspond to a fixed resolution, such as QXGA resolution (2048×1536). Therefore, scaling block 632 samples the raw image sensor data to generate digital image data scaled to a desired resolution, such as a resolution corresponding to 1080p High Definition (HD) video (1920×1080). Scaling may be performed via sampling techniques, interpolation techniques, or some combination of sampling and interpolation.

Figure 7:
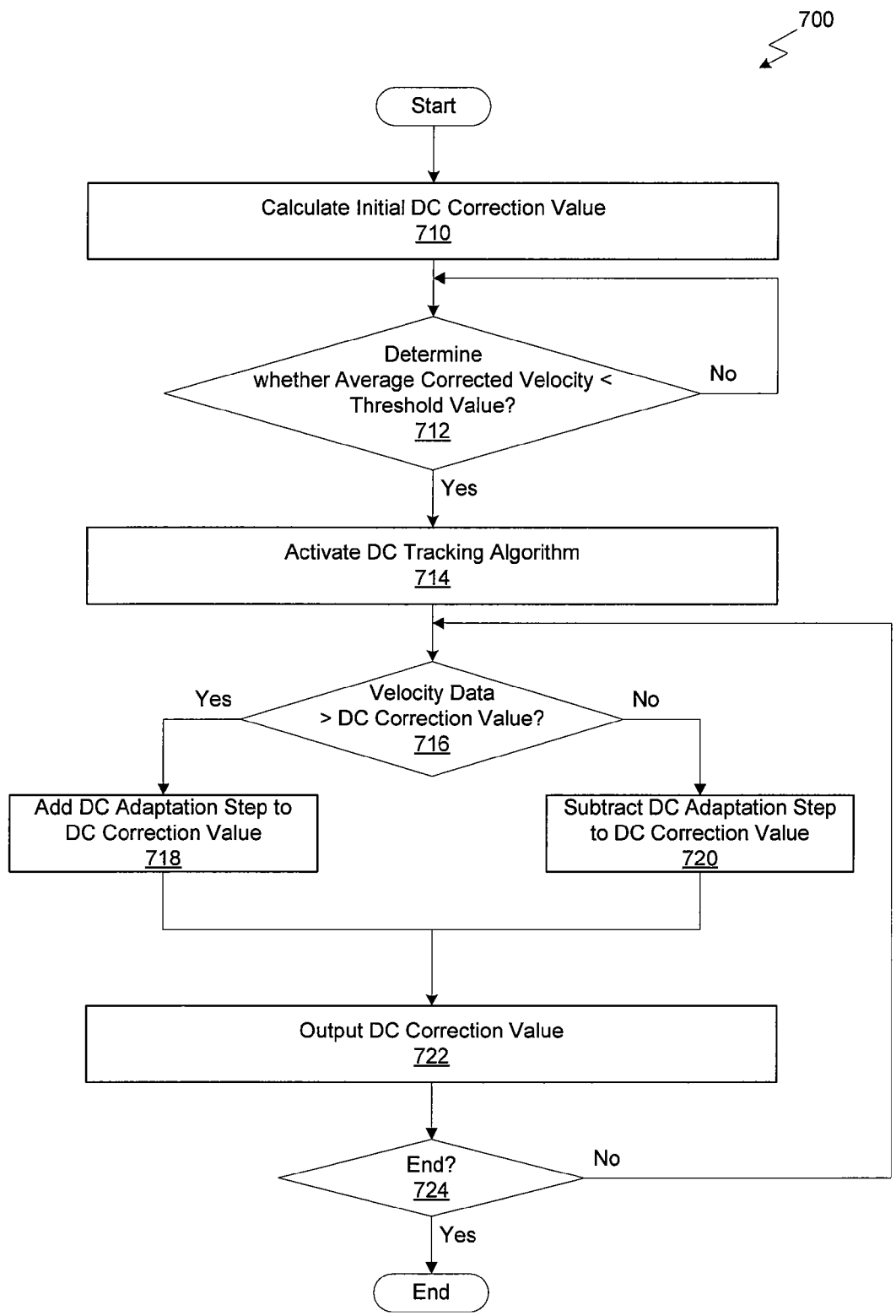
FIG. 7 is a flow diagram of method steps for an algorithm implemented by the DC (Direct Current) level block of FIG. 6, according to one example embodiment.

FIG. 7 is a flow diagram of method steps 700 for an algorithm implemented by DC level block 616 of FIG. 6, according to one example embodiment. Although the method steps 700 are described in conjunction with the systems of FIGS. 1-6, persons skilled in the art will understand that any system configured to perform the method steps is within the scope of the disclosure.

Method 700 begins at step 710 where DC level block 616 calculates an initial DC correction value (DC). In one embodiment, the initial DC correction value is derived from a linear equation, as illustrated by Equation (ii), corresponding to a slope value (a) and an offset value (b) set via a calibration routine performed during the manufacture of the digital camera 300 and stored in a hidden partition of memory 320. Temperature data 612 provides the current temperature (T) of the gyroscope 330, which is used to calculate the initial DC correction value via the linear equation.

$$DC_i = a*T + b \qquad \text{(ii)}$$

At step 712, DC level block 616 determines whether an average corrected velocity value is less than a threshold value. In one embodiment, although not explicitly shown in FIG. 6, DC block 616 receives feedback of the corrected velocity data 611-2 transmitted to acceleration block 618. For the first couple of seconds when the digital camera 300 is turned on and the digital image stabilization algorithm is started, the DC level block 616 determines an average corrected velocity value by calculating a mean value of N previously corrected velocity data 611-2 samples. DC level block 616 compares the average corrected velocity value to a threshold value stored in memory 320. The threshold value represents a maximum corrected velocity of the digital camera 300 that indicates whether the digital image stabilization algorithm may be started. If the average corrected velocity value is greater than or equal to the threshold value, then method 700 waits at step 712 until the average corrected velocity value is less than the threshold value and method 700 proceeds to step 714.

At step 714, digital camera 300 activates the DC tracking algorithm. In one embodiment, the DC tracking algorithm implements a sigma-delta algorithm. In other words, during each sample time, the DC level block 616 determines a DC correction value 613 by either adding or subtracting an incremental DC adaptation step value from the DC correction value 613 calculated during the previous sample time. At step 716, DC level block 616 determines whether the filtered velocity data 611-1 (before correction) is greater than the DC correction value 613. If the filtered velocity data 611-1 is greater than the DC correction value 613, then at step 718 DC level block 616 adds the DC adaptation step value to the previous DC correction value 613 to generate a current DC correction value 613. However, if the filtered velocity data 611-1 is less than or equal to the DC correction value 613, then at step 720 DC level block 616 subtracts the DC adaptation step value from the DC correction value 613 to generate the current DC correction value 613. At step 722, DC level block 616 outputs the DC correction value 613 in order to enable corrected velocity data 611-2 to be generated by subtracting the DC correction value 613 from filtered velocity data 611-1. At step 724, a determination is made as to whether the digital image stabilization algorithm is deactivated. If the digital image stabilization algorithm remains active, then method 700 returns to step 716 and a new DC correction value 613 is calculated. However, if at step 724 the digital image stabilization algorithm is deactivated, then method 700 terminates.

It will be appreciated that the sigma-delta algorithm is only one technically feasible algorithm for generating the DC correction value 613. For example, in one embodiment, the DC level block 616 could track the temperature data 612 generated by gyroscope 330 and calculate the DC correction value 613 based on Equation (ii). In another embodiment, another technically feasible algorithm may be implemented that calculates a DC correction value based, at least in part, on temperature data 612. For example, DC level correction block 616 may integrate the corrected velocity data 611-2 over time and only adjust the DC correction value 613 if the integrated accumulation becomes too large, indicating that the DC correction value 613 likely has an error.

Figure 8:
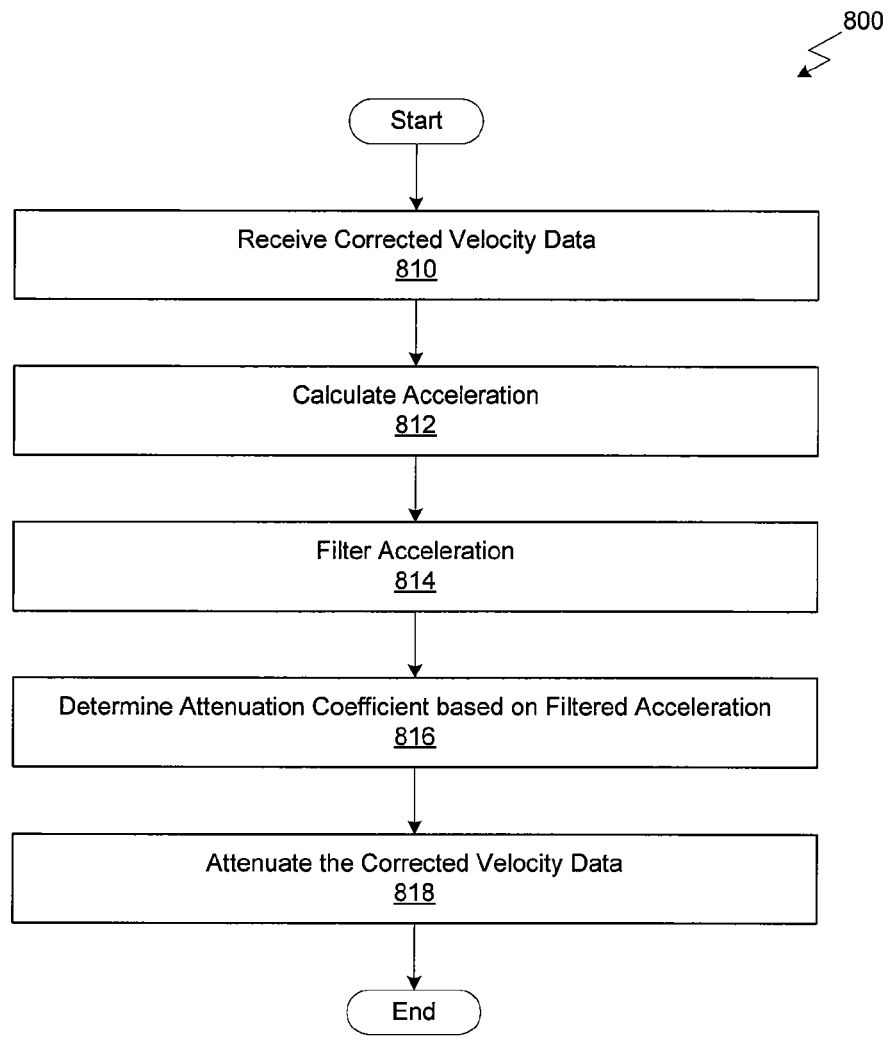
FIG. 8 is a flow diagram of method steps for an algorithm implemented by the acceleration block of FIG. 6, according to one example embodiment.

FIG. 8 is a flow diagram of method steps 800 for an algorithm implemented by acceleration block 618 of FIG. 6, according to one example embodiment. Although the method steps 800 are described in conjunction with the systems of FIGS. 1-6, persons skilled in the art will understand that any system configured to perform the method steps is within the scope of the disclosure.

Method 800 begins at step 810, where acceleration block 618 receives corrected velocity data 611-2. At step 812, acceleration block 618 calculates one or more accelerations for digital camera 300. In one embodiment, acceleration block 618 calculates the derivative of the velocity for each dimension associated with velocity data 611. For example, a change in velocity corresponds to the difference between two adjacent samples of corrected velocity data 611-2 and a change in time corresponds to the sampling time of gyroscope 330. The derivative of the velocity is then derived by dividing the change in velocity by the change in time.

At step 814, acceleration block 618 implements a median filter to remove noise from the calculated acceleration signal. In one embodiment, the filter window is two samples wide (i.e., the current acceleration and the previous acceleration) and the median filter outputs the mean of the two samples. In another embodiment, the filter window is three or more samples wide and the median filter outputs the median sample from the three or more samples. If the filter window width corresponds to an even number of samples, then the mean of the two median samples within the filter window is output by the median filter.

At step 816, acceleration block 618 determines an attenuation coefficient based on the filtered acceleration value. During each sample time, the acceleration block performs a look-up operation based on the filtered acceleration value. For example, the acceleration block 618 may perform an operation to generate an index into a look-up table stored in memory 320. The index may be generated based on the magnitude of the filtered acceleration value. In another embodiment, the attenuation coefficient may be generated using a calculation based on the magnitude of the acceleration, such as by multiplying the acceleration by a coefficient. At step 818, acceleration block 618 attenuates the corrected velocity data 611 by multiplying the corrected velocity data 611-2 by the attenuation coefficient generated in step 816. The attenuated velocity data 611-3 is transmitted to the CSS block 620 as well as the pan detection block 622, and method 800 terminates.

Figure 9:
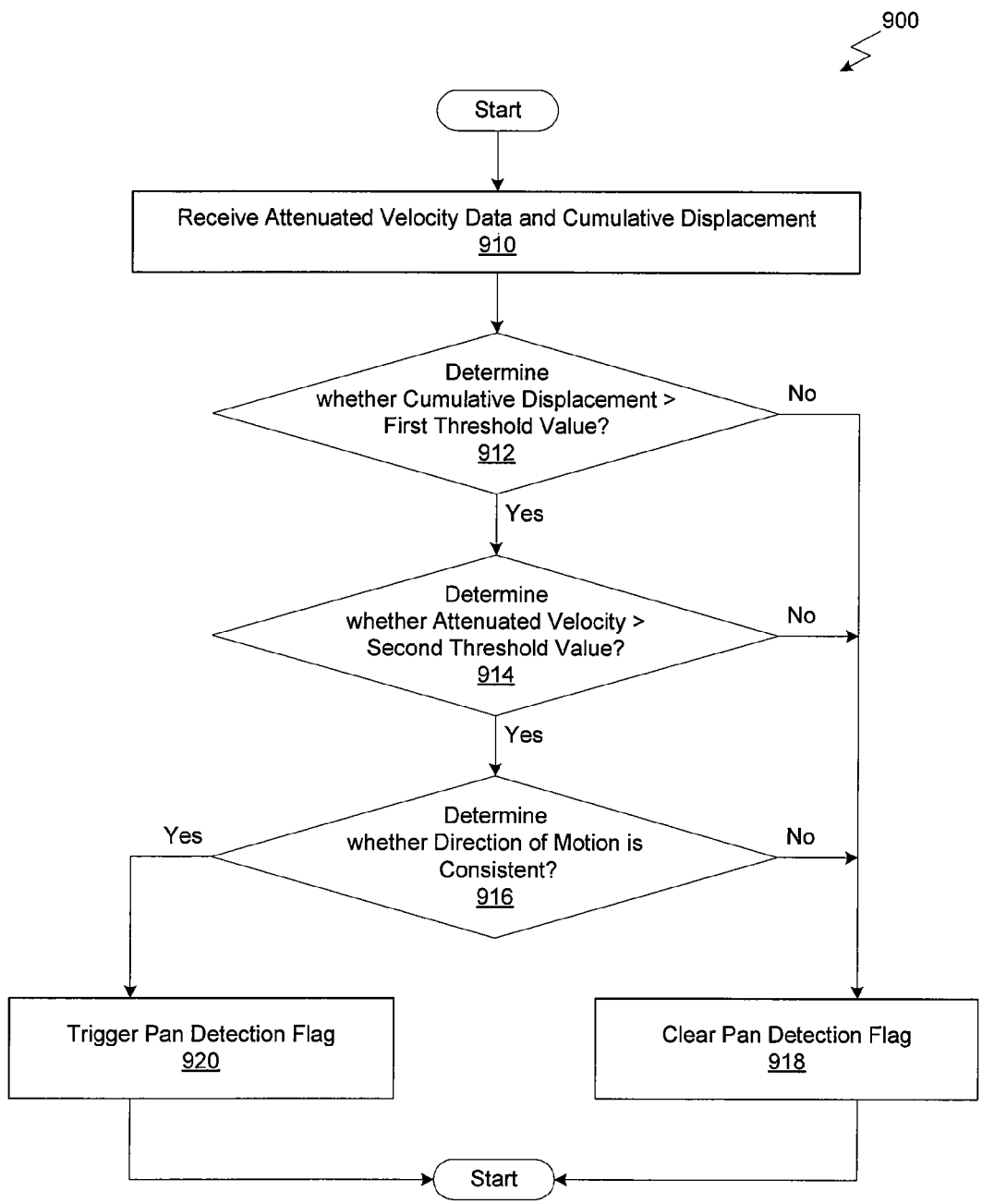
FIG. 9 is a flow diagram of method steps for an algorithm implemented by the pan detection block of FIG. 6, according to one example embodiment.

FIG. 9 is a flow diagram of method steps 900 for an algorithm implemented by pan detection block 622 of FIG. 6, according to one example embodiment. Although the method steps 900 are described in conjunction with the systems of FIGS. 1-6, persons skilled in the art will understand that any system configured to perform the method steps is within the scope of the disclosure.

Method 900 begins at step 910, where pan detection block 622 receives attenuated velocity data 611-3 from acceleration block 618 as well as a cumulative displacement from CSS block 620. At step 912, pan detection block 622 determines whether the cumulative displacement is greater than a first threshold value. In one embodiment, the pan detection block 622 determines whether the cumulative displacement has saturated the image sensor 100 (i.e., the cumulative displacement corresponds to an offset vector that would result in at least one pixel in the subset of active pixel locations being off the edge of the image sensor 100). In another embodiment, the threshold value corresponds to a minimum amount of displacement that may accumulate before a panning motion may be triggered. If the cumulative displacement is less than or equal to the first threshold value, then method 900 proceeds to step 918 where a pan detection flag is cleared and method 900 terminates. The pan detection flag may be a bit in a register of the digital camera 300 that reflects whether the digital camera is being panned. Returning to step 912, if the cumulative displacement is greater than the first threshold value, then a panning motion may be detected and method 900 proceeds to step 914.

At step 914, pan detection block 622 determines whether the attenuated velocity data 611-3 is greater than a second threshold value. In one embodiment, the pan detection block 622 determines whether the attenuated velocity data 611-3 is above a minimum magnitude (i.e., the motion of the camera exceeds a certain speed). If the attenuated velocity data 611-3 is less than or equal to the second threshold value, then method 900 proceeds to step 918. However, if the attenuated velocity data 611-3 is greater than the second threshold value, then method 900 proceeds to step 916.

At step 916, pan detection block 622 determines whether the digital camera 300 is moving in a substantially uniform direction. In one embodiment, the pan detection block 622 counts the number of samples where the direction of the attenuated velocity data 611-3 is in a substantially uniform direction (i.e., the digital camera 300 is moving continuously clockwise or continuously counter-clockwise around a particular axis). In one embodiment, pan detection block implements a circuit that counts the number of consistent samples using SR (set/reset) flip-flops. If the number of consecutive samples of attenuated velocity data 611-3 that indicate motion in a substantially uniform direction is less than or equal to a third threshold value, then pan detection block 622 determines that the direction of motion is not consistent, and method 900 proceeds to step 918, discussed above. However, if the number of consecutive samples of attenuated velocity data 611-3 that indicate motion in a substantially uniform direction is greater than the third threshold value, then method 900 proceeds to step 920 where the pan detection flag is set to indicate that digital camera 300 is in a panning motion. Method 900 then terminates.

It will be appreciated that the algorithm described by the method steps of method 900 only indicate that the digital camera 300 is in a panning motion when cumulative displacement has reached a limit, the velocity is above a minimum threshold, and the direction of the motion is consistent in a substantially uniform direction for a number of consecutive samples. In alternative embodiments, the algorithm may utilize other methods for determining whether a panning motion has begun, such as by triggering the pan detection flag if any of the three aforementioned tests are positive, or if two out of three tests are positive.

It will also be appreciated that a separate pan detection flag may be implemented for each dimension associated with velocity data 611. Alternately, a single pan detection flag may be implemented that detects whether a panning motion has begun by monitoring displacement, velocity, and direction of motion in multiple dimensions.

Figure 10:
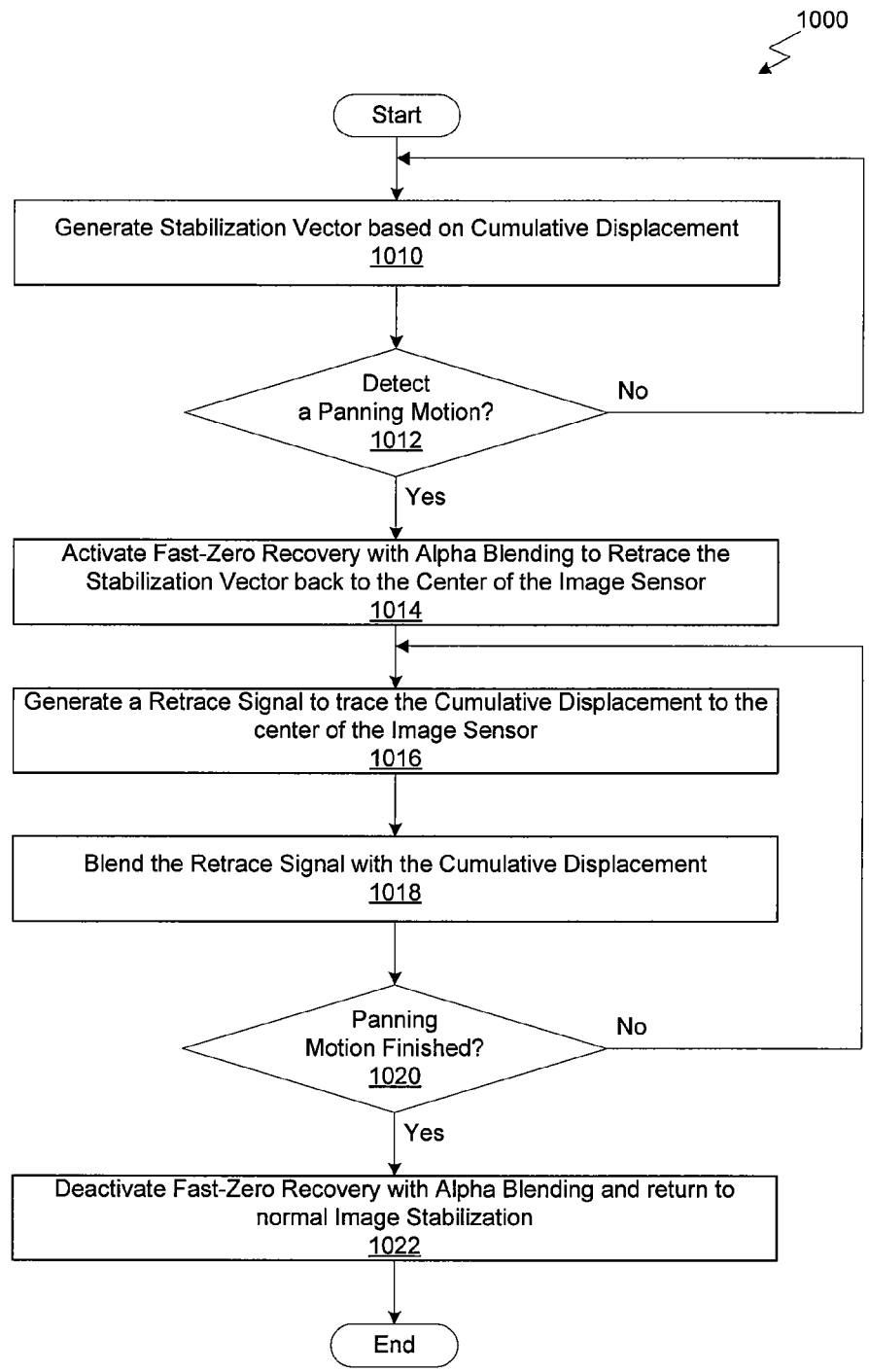
FIG. 10 is a flow diagram of method steps for an algorithm implemented by the fast zero recovery and alpha blending block of FIG. 6, according to one example embodiment.

FIG. 10 is a flow diagram of method steps 1000 for an algorithm implemented by FZRAB block 624 of FIG. 6, according to one example embodiment. Although the method steps 1000 are described in conjunction with the systems of FIGS. 1-6, persons skilled in the art will understand that any system configured to perform the method steps is within the scope of the disclosure.

Method 1000 begins at step 1010, where FZRAB block 624 generates a stabilization vector based on the cumulative displacement received from pan detection block 622. In one embodiment, the stabilization vector is the opposite of the cumulative displacement such that the subset of active pixels effectively cancels out any perceived small motions of the digital camera 300. At step 1012, FZRAB block 624 determines whether a panning motion is detected. In one embodiment, FZRAB block 624 monitors the pan detection flag received from pan detection block 622. If the pan detection flag indicates that digital camera 300 is not being panned, then method 1000 returns to step 1010 to generate the next stabilization vector. However, if at step 1012 the pan detection flag indicates that digital camera 300 is being panned, then method 1000 proceeds to step 1014.

At step 1014, FZRAB block 624 activates fast-zero recovery with alpha blending to retrace the stabilization vector (and the cumulative displacement) back towards the center of the image sensor 100. At step 1016, FZRAB block 624 generates a retrace displacement that, when blended with the cumulative displacement, causes the cumulative displacement to retrace back to the center of the image sensor 100. The retrace displacement may be blended with the cumulative displacement such that the change in acceleration of the cumulative displacement is smoothed. In one embodiment, the FZRAB block 624 traces the cumulative displacement back to zero in a linear manner. For example, the FZRAB block 624 may set the retrace displacement equal to the cumulative displacement at the start of the panning motion. Then, for each subsequent sampling time, the FZRAB block 624 may be configured to subtract a fixed number of pixels from the retrace displacement at the previous sampling time until the retrace displacement is zeroed out. In another embodiment, the FZRAB block 624 multiplies the retrace displacement by a gain that is less than one such that the attenuated retrace displacement approaches a zero value.

At step 1018, FZRAB block 624 blends the retrace displacement with the cumulative displacement to create a smooth transition between the cumulative displacement generated based on velocity data 611 and a forced retrace displacement that moves toward the center of the image sensor 100. In order to provide a smooth transition, FZRAB block 624 is configured to blend the retrace displacement with the cumulative displacement at the start of a panning motion. In one embodiment, for each sampling time from the start of the panning motion, the FZRAB block 624 calculates a decay rate that begins at unity (1) during the first sampling time after the start of the panning motion. The decay rate logarithmically decays towards zero (0) over the next five frames of video such that the decay rate is zero at the sampling time corresponding to the beginning of the sixth frame of video after the start of the panning motion. The FZRAB block 624 then calculates a blended displacement ($D_{Blend}$), which is the sum of the retrace displacement ($D_{Retrace}$), multiplied by one minus the decay rate (Decay), plus the cumulative displacement (D), multiplied by the decay rate, as shown by equation (iii).

$$D_{Blend}(n) = D_{Retrace}(n) * (1 - \text{Decay}) + D(n) * (\text{Decay}) \quad \text{(iii)}$$

It will be appreciated that during a panning motion, the digital camera 300 is typically moving in a uniform direction and the cumulative displacement is increasing away from the center of the image sensor 100. Once the panning motion is detected, the retrace displacement causes the blended displacement vector to decrease towards zero. The FZRAB block 624 generates a stabilization vector based on the calculated blended displacement. In one embodiment, the stabilization vector is a vector that is opposite from the blended displacement vector. For example, if the blended displacement vector represents the motion of the digital camera 300 in a first direction, the stabilization vector represents an offset associated with the active pixel locations of image sensor 100 such that the digital image generated based on the active pixel locations remains relatively stable during video capture.

At step 1020, FZRAB block 624 determines whether the panning motion is finished. If the panning motion is not finished, then FZRAB 624 continues to retrace the stabilization vector back to the center of the image sensor 100. However, if the panning motion is finished, then method 1000 proceeds to step 1022 where FZRAB block 624 deactivates fast-zero recovery with alpha blending and returns to a normal mode of operation. After step 1022, method 1000 terminates.

In sum, example embodiments provide systems and methods for capturing digital video using a digital image stabilization algorithm. A digital camera includes a gyroscope to measure motion of the digital camera. The digital camera processes the signals from the gyroscope to track the total displacement of the image sensor over a series of frames. The digital image stabilization algorithm may implement one or more of a DC level adjustment to correct small variations in the gyroscope, an acceleration filter to attenuate the effects of large accelerations in the digital image stabilization, a pan detection algorithm to efficiently detect when the camera is intentionally being panned, and a fast-zero recovery and alpha blending algorithm to hide re-centering of the stabilization vector during a camera movement.

One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments, other and further embodiments may be devised without departing from the basic scope thereof. Therefore, the scope is determined by the claims that follow.

We claim:

1. A non-transitory computer-readable medium including instructions that, when executed by a processing unit, cause the processing unit to perform the steps of:
   receiving motion feedback data via a motion sensor configured to detect motion associated with a digital camera;
   determining an adjusted DC (direct current) level associated with the motion sensor that corresponds to the digital camera having zero motion, wherein determining the adjusted DC level comprises receiving a DC level, comparing the DC level to the motion feedback data received via the motion sensor, and adjusting the DC level in response to the comparison;
   modifying the motion feedback data based on the adjusted DC level;
   identifying a plurality of active pixel locations based on the modified motion feedback data that comprise a subset of all pixel locations associated with an image sensor of the digital camera, wherein each active pixel location is offset from a corresponding pixel location associated with the image sensor, and each corresponding pixel location is associated with a zero offset; and
   generating a digital image based on the plurality of active pixel locations.

2. The computer-readable medium of claim 1, wherein the motion sensor comprises a gyroscope, and the motion feedback data comprises rotational velocity data corresponding to one or more axes of the digital camera.

3. The computer-readable medium of claim 1, wherein adjusting the DC level comprises:
   if the motion feedback data is greater than the DC level, then incrementing the DC level by a DC level adaptation step, or
   if the motion feedback data is less than or equal to the DC level, then decrementing the DC level by the DC level adaptation step.

4. The computer-readable medium of claim 3, wherein determining the adjusted DC level further comprises calculating an initial DC level based on a temperature associated with the motion sensor.

5. The computer-readable medium of claim 1, the steps further comprising detecting that the digital camera is undergoing a panning motion.

6. The computer-readable medium of claim 5, wherein detecting that the digital camera is undergoing a panning motion comprises:
   determining that the displacement of the digital camera based on the modified motion feedback data is greater than a first threshold value; and
   triggering a pan detection flag to indicate that the digital camera is in the panning motion.

7. The computer-readable medium of claim 6, wherein detecting that the digital camera is undergoing a panning motion further comprises, in addition to determining that the displacement of the digital camera based on the modified motion feedback data is greater than the first threshold value, determining that the velocity of the digital camera indicated by the modified motion feedback data is greater than a second threshold value.

8. The computer-readable medium of claim 7, wherein detecting that the digital camera is undergoing a panning motion further comprises, in addition to determining that the velocity of the digital camera indicated by the modified motion feedback data is greater than the second threshold value, determining that a number of consecutive samples of the modified motion feedback data having a uniform direction is greater than a third threshold value.

9. A system, comprising:
   an image sensor associated with a digital camera and including a plurality of pixel locations; and
   a processing unit coupled to the image sensor and configured to:
      receive motion feedback data via a motion sensor configured to detect motion associated with a digital camera,
      determine an adjusted DC (direct current) level associated with the motion sensor that corresponds to the digital camera having zero motion, wherein determining the adjusted DC level comprises receiving a DC level, comparing the DC level to the motion feedback data received via the motion sensor, and adjusting the DC level in response to the comparison,
      modify the motion feedback data based on the adjusted DC level,
      identify a plurality of active pixel locations based on the modified motion feedback data that comprise a subset of all pixel locations associated with the image sensor of the digital camera, wherein each active pixel location is offset from a corresponding pixel location associated with the image sensor, and each corresponding pixel location is associated with a zero offset, and
      generate a digital image based on the plurality of active pixel locations.

10. The system of claim 9, wherein the motion sensor comprises a gyroscope, and the motion feedback data comprises rotational velocity data corresponding to one or more axes of the digital camera.

11. The system of claim 9, wherein the image sensor is a complementary metal oxide semiconductor (CMOS) image sensor.

12. The system of claim 9, wherein adjusting the DC level comprises:

comparing the DC level to the motion feedback data to determine whether the motion feedback data is greater than the DC level; and if the motion feedback data is greater than the DC level, then incrementing the DC level by a DC level adaptation step, or if the motion feedback data is less than or equal to the DC level, then decrementing the DC level by the DC level adaptation step.

13. The system of claim 9, the processing unit further configured to attenuate the motion feedback data based on the acceleration of the digital camera.

14. The system of claim 9, the processing unit further configured to detect that the digital camera is undergoing a panning motion.

15. The system of claim 14, the processing unit further configured to, in response to detecting the panning motion, activate a fast zero recovery with alpha blending operation that causes the offset associated with each active pixel location to approach a zero offset.

16. A non-transitory computer-readable medium including instructions that, when executed by a processing unit, cause the processing unit to perform the steps of:

receiving motion feedback data via a motion sensor configured to detect motion associated with a digital camera;

determining a DC (direct current) level associated with the motion sensor that corresponds to the digital camera having zero motion;

modifying the motion feedback data based on the DC level;

attenuating the motion feedback data based on an acceleration of the digital camera;

identifying a plurality of active pixel locations based on the modified, attenuated motion feedback data that comprise a subset of all pixel locations associated with an image sensor of the digital camera, wherein each active pixel location is offset from a corresponding pixel location associated with the image sensor, and each corresponding pixel location is associated with a zero offset; and generating a digital image based on the plurality of active pixel locations.

17. The computer-readable medium of claim 16, wherein attenuating the motion feedback data comprises:

differentiating the modified motion feedback data to determine the acceleration of the digital camera;

determining an attenuation coefficient based on the acceleration of the digital camera; and multiplying the modified motion feedback data by the attenuation coefficient.

18. A non-transitory computer-readable medium including instructions that, when executed by a processing unit, cause the processing unit to perform the steps of:

receiving motion feedback data via a motion sensor configured to detect motion associated with a digital camera;

determining a DC (direct current) level associated with the motion sensor that corresponds to the digital camera having zero motion;

modifying the motion feedback data based on the DC level;

detecting that the digital camera is undergoing a panning motion;

in response to detecting that the digital camera is undergoing the panning motion, activating a fast zero recovery with alpha blending operation;

identifying a plurality of active pixel locations based on the modified motion feedback data that comprise a subset of all pixel locations associated with an image sensor of the digital camera, wherein each active pixel location is offset from a corresponding pixel location associated with the image sensor, and each corresponding pixel location is associated with a zero offset, and wherein the offset associated with each active pixel location has been reduced due to the activation of the fast zero recovery with alpha blending operation; and generating a digital image based on the plurality of active pixel locations.

19. The computer-readable medium of claim 18, wherein the fast zero recovery with alpha blending operation comprises:

calculating a displacement vector at the start of the panning motion that represents, for each active pixel location, the offset of the active pixel location from the corresponding pixel location; and for each sampling of the motion feedback data:

generating a retrace vector by subtracting a fixed value from each component of the displacement vector, and blending the displacement vector with the retrace vector to generate a stabilization vector that, when applied to the one or more active pixel locations, causes the offset associated with each active pixel location to approach a zero offset.

20. The computer-readable medium of claim 19, wherein blending the displacement vector with the retrace vector comprises:

calculating a decay rate based on an elapsed time from the start of the panning motion; and summing the product of the displacement vector and the quantity one minus the decay rate with the product of the retrace vector and the decay rate.

* * * * *

UNITED STATES PATENT AND TRADEMARK OFFICE
CERTIFICATE OF CORRECTION

PATENT NO. : 8,553,096 B2  
APPLICATION NO. : 13/312857  
DATED : October 8, 2013  
INVENTOR(S) : Proca et al.

It is certified that error appears in the above-identified patent and that said Letters Patent is hereby corrected as shown below:

In the Specification

Column 12, Line 51, please delete "(DC)" and insert --$(DC_i)$-- therefor.

Signed and Sealed this
Thirty-first Day of December, 2013

Margaret A. Focarino
*Commissioner for Patents of the United States Patent and Trademark Office*